Sept. 25, 1956     O. E. KASE ET AL     2,764,410

CARD POSITION SELECTING MEANS

Filed June 7, 1952                         10 Sheets-Sheet 2

INVENTORS.
OTTO E. KASE
EARL S. RICE

BY

ATTORNEYS

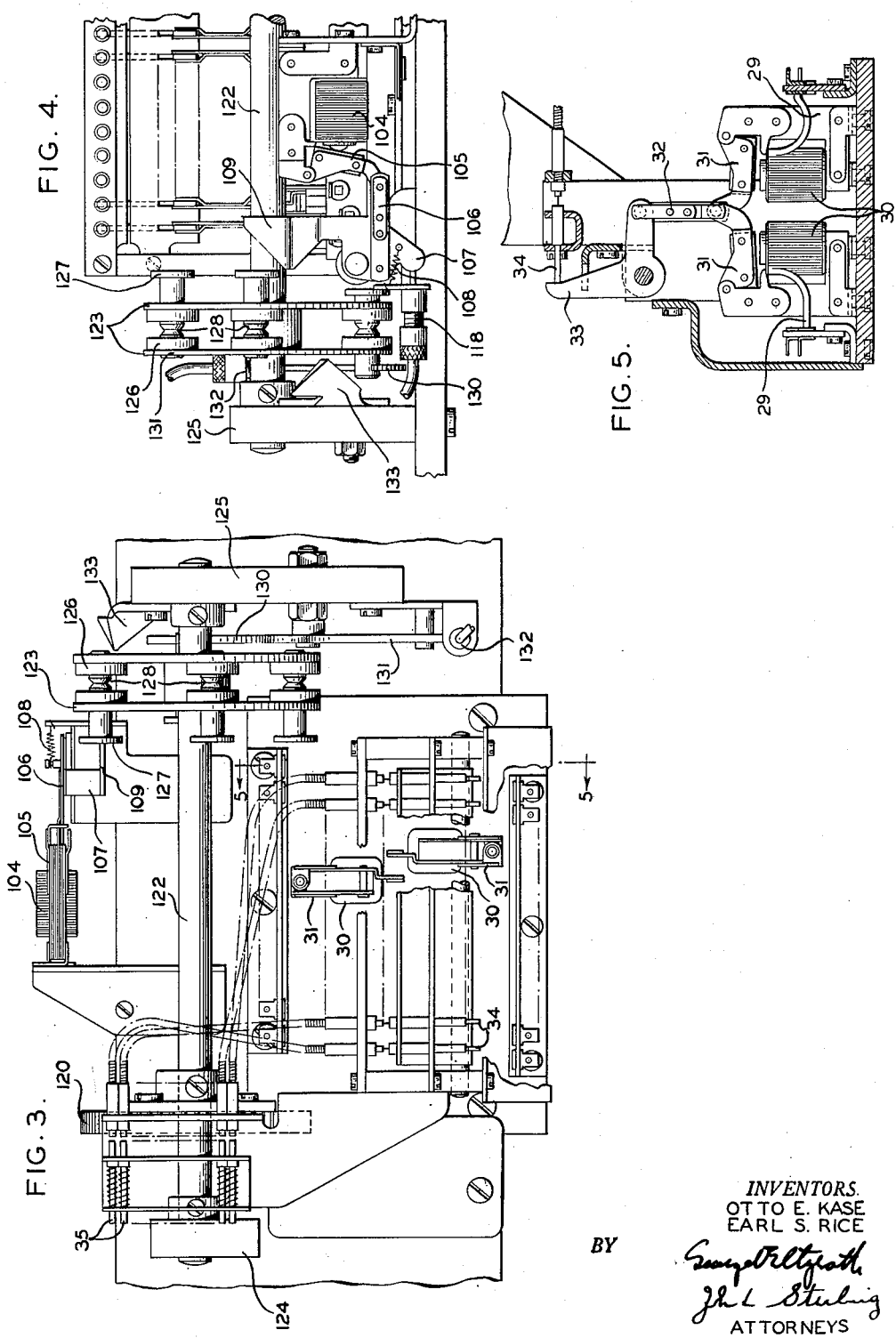

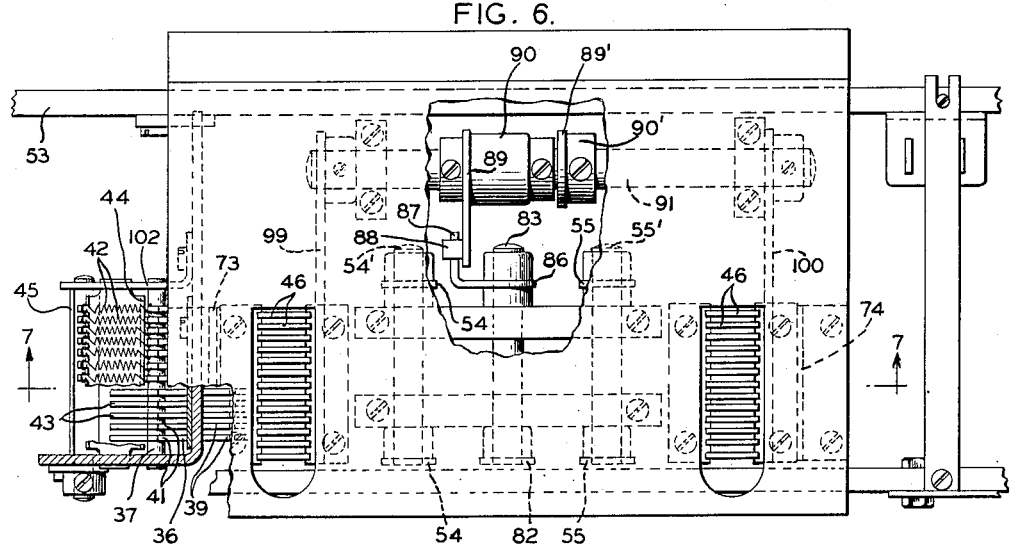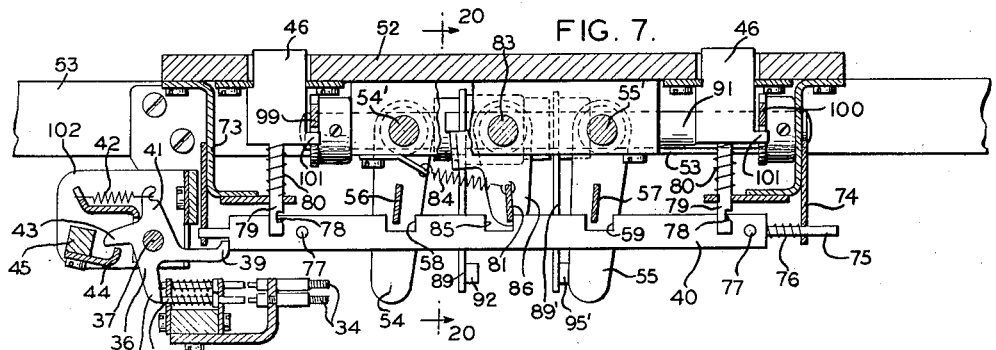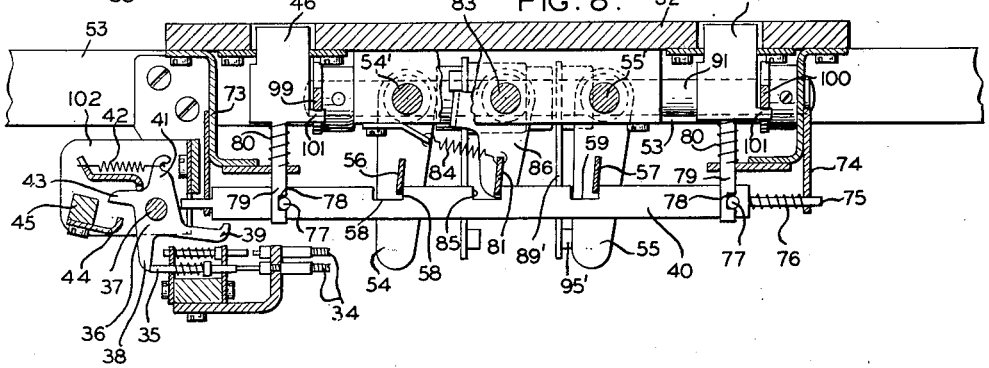

Sept. 25, 1956

O. E. KASE ET AL 2,764,410

CARD POSITION SELECTING MEANS

Filed June 7, 1952

INVENTORS.
OTTO E. KASE
EARL S. RICE

BY

ATTORNEYS

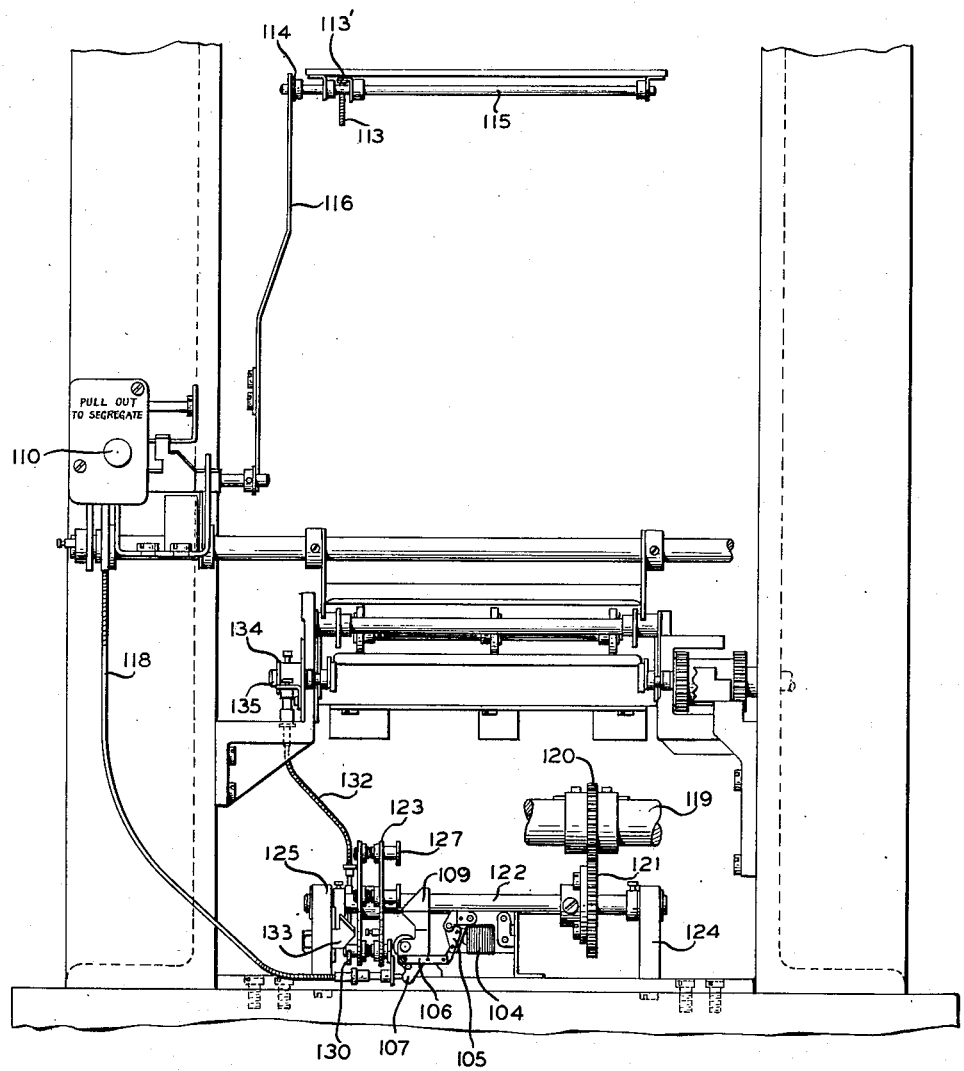

Sept. 25, 1956     O. E. KASE ET AL     2,764,410
CARD POSITION SELECTING MEANS
Filed June 7, 1952     10 Sheets-Sheet 7
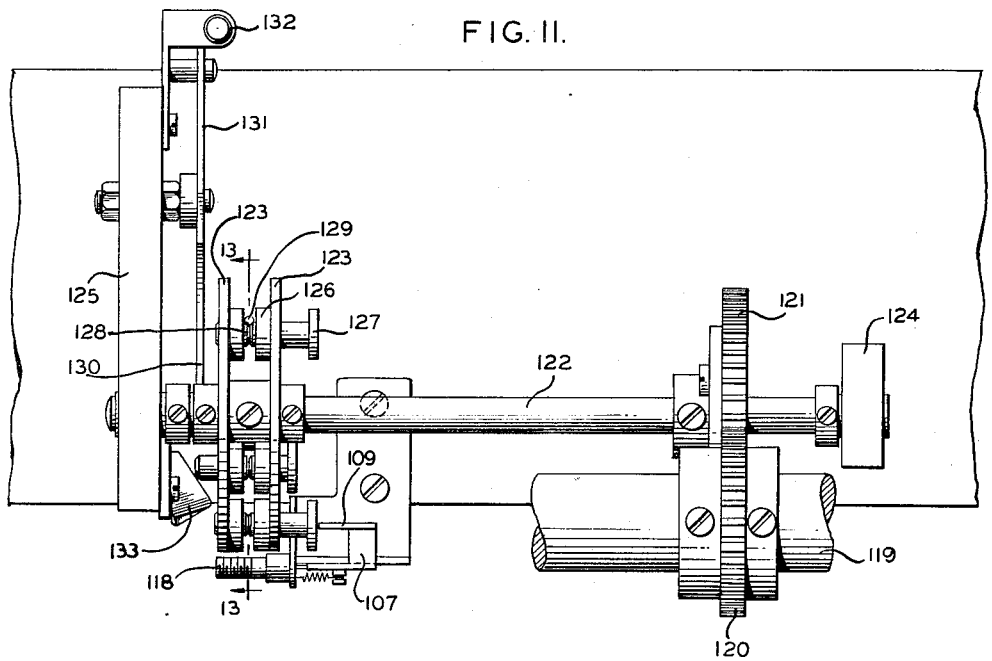
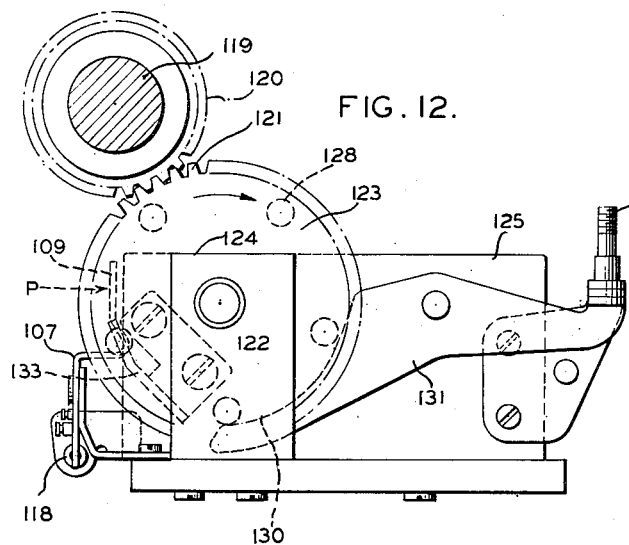
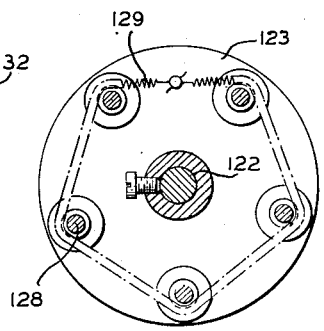
INVENTORS.
OTTO E. KASE
EARL S. RICE
BY
ATTORNEYS Sept. 25, 1956 O. E. KASE ET AL 2,764,410
CARD POSITION SELECTING MEANS
Filed June 7, 1952 10 Sheets-Sheet 8

INVENTORS.
OTTO E. KASE
EARL S. RICE
BY
ATTORNEYS

Sept. 25, 1956  O. E. KASE ET AL  2,764,410
CARD POSITION SELECTING MEANS
Filed June 7, 1952  10 Sheets-Sheet 10
FIG. 16.
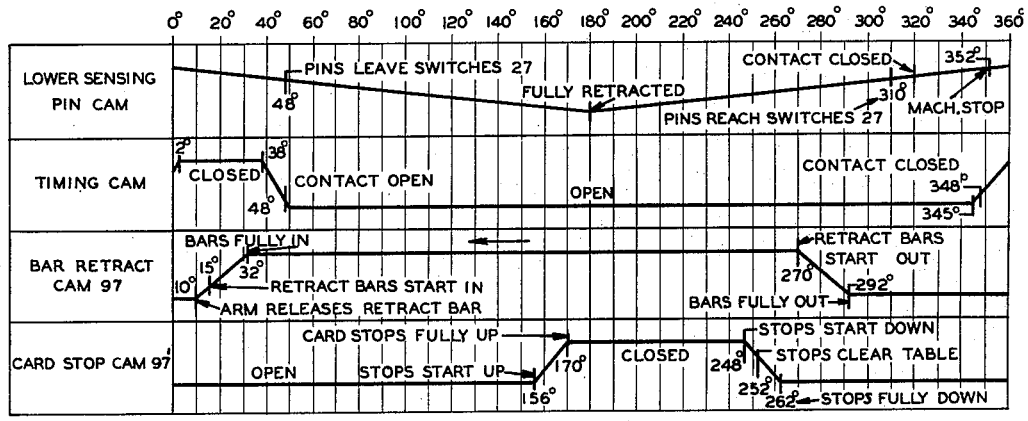
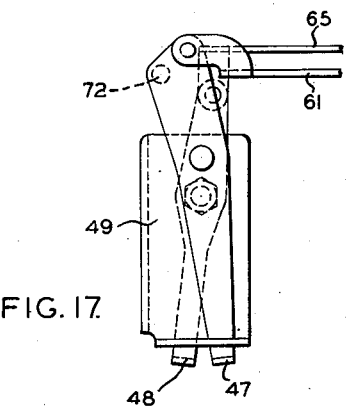
FIG. 17.
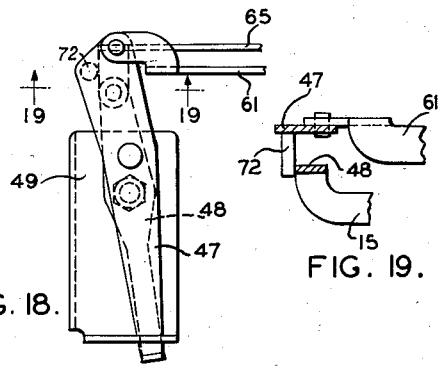
FIG. 18.   FIG. 19.
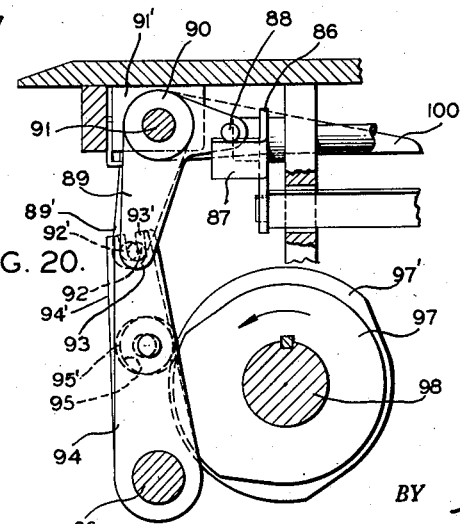
FIG. 20.
INVENTORS.
OTTO E. KASE
EARL S. RICE
BY
ATTORNEYS United States Patent Office 2,764,410
Patented Sept. 25, 1956

2,764,410

CARD POSITION SELECTING MEANS

Otto E. Kase, Stamford, Conn., and Earl S. Rice, Fanwood, N. J., assignors, by mesne assignments, to Sperry Rand Corporation, New York, N. Y., a corporation of Delaware Application June 7, 1952, Serial No. 292,324

14 Claims. (Cl. 271—60)

This invention relates to new and useful improvements in printing interpreters to permit of automatic finding of the printing line in any zone of statistical cards.

Hitherto the printing line has been determined by manual means as to whether printing is to take place in the upper or the lower zone of the card. The manual setting of these controls permits upper field interpretations, lower field interpretations, and independent stop interpretations. These settings, however, have permitted printing on only a relatively few lines of the card.

It is an object of this invention to provide simple and efficient mechanism whereby the former manual settings are positioned for one zone interpretation and automatic means made effective to take over to automatically print in that zone of a card on as many as thirteen lines through the control intermediary of control holes punched in the trailer cards. By this means a "lead" card will enter the machine and the data on the desired zone will be sensed and set-up and held and will be printed automatically on the proper line of a following trailer.

It is further an object of the invention to provide simple and efficient mechanism whereby, when a card that has been fully posted passes out of the machine, automatic mechanism is activated to segregate it from the cards which have not been fully posted.

Further and more specific objects, features, and advantages will more clearly appear from a consideration of the specification hereinafter set forth especially when taken in connection with the accompanying drawings which illustrate a present preferred form which the invention may assume and which form part of the specification.

In general consideration of the invention it is to be noted that the invention is applied to printing interpreters of the general types shown in U. S. patents as follows: No. 2,311,471, issued Feb. 16, 1943, to R. W. Ritzert and entitled "Printing Interpreter"; No. 2,426,951, issued Sept. 2, 1947, to the same inventor with the same title; and No. 2,550,370, issued April 24, 1951, to John Mueller and entitled "Printing Interpreter."

In machines of this general nature it is usual to advance lead cards into them to be sensed and to set up the data thereon to be printed on a following trailer card on a preselected line of a given zone thereof. The determination of the zone in which the material is to be printed has heretofore been achieved by manual means and only a relatively few lines of printing were possible. In the embodiment of this invention the preferred operation described will consider the sensing of data in the upper zone of a lead card and the subsequent printing of this data on any of thirteen lines in the upper zone of the trailer card, the selection of the line on which to print being automatically determined through the intermediary of control holes previously punched in the trailer card preferably in the lower zone thereof.

In these interpreters there is a wiring unit which can be manually shifted for interpretation in either zone of the card. In connection with the form shown herein this unit is shifted for upper zone interpretation and then an electrical control switch is shifted to bring into play the automatic line finder mechanism of the invention. This line finder mechanism involves the disabling of three collumns of the set-pin unit so that these columns of the card can be sensed, since the control holes will be found therein, but the pins therein will not be set-up. The pins thus actuated by the sensing of one or more control holes will actuate Bowden wires to selectively actuate one or more of a series of switches. Each of these switches is connected to an electromagnetic actuator and each actuator is adapted, when energized, to move a Bowden wire and the movement of this wire will actuate a stop finger to remove it from engagement with a card stop latch bar and permit the latch bar to hold down the stop and prevent it from rising into card stopping position. Thus the first control hole will effect the hold down of the first card stop to permit printing on the second line of the card; the presence of the first and second control holes in the card will effect the hold down of the first two stops and permit printing on the third line of the card and so on. Finally, the presence of the twelve control holes will hold down twelve stops and permit printing on the thirteenth line of the card. The thirteenth card stop is not under control of a hole and is raised and lowered each cycle.

In this improved machine there is also provided a thirteenth actuator which is energized simultaneously with the energization of the twelfth actuator, and this thirteenth actuator is connected to a Bowden wire extending to and making effective, when operated, a pocket gate control mechanism to segregate the card which is thus fully posted. This pocket gate control mechanism is also under the influence of another Bowden wire which is associated with the mechanism on the machine for the non-print of the lead card and which is a regular part of such machines. Therefore when the non-print mechanism is set, this gate mechanism is operated to segregate the ejected lead card and is also operable, as above described, to segregate the ejected fully posted trailer cards.

From the above general outline of the mechanism it will be apparent that there is provided means under influence of the control holes in the trailer cards to energize electrical means to release or unblock selective stop latch bars to allow the selected stop to be held down. The latch bars are cyclically oscillated back and forth but only those which are unblocked are allowed to move to a position where their stops can be held down. This is because all the blocking elements are normally in blocking position unless released by the presence of control holes in the cards.

Broadly speaking, the gate operating mechanism to eject lead or fully posted trailer cards involves a constantly rotating member having movable buttons thereon. A cam-like interponent is actuated either under the thirteenth actuator or the non-print mechanism, as the case may be, to move this interponent into the path of the next button which comes around to contact. The button is then moved to an active position and subsequently engages a cam bar connected to a Bowden wire extending to the linkage associated with the front gate to lift the gate and permit either lead cards or fully posted trailer cards to be deposited in said pocket.

The present preferred form which the invention may assume is illustrated in the drawing, in which Fig. 1 is a vertical front to rear cross section through a portion of a printing interpreter in which the invention is embodied;

Fig. 3 is a plan view of the mechanism shown in Fig. 2 with certain of the upper structure and elements removed for clarity, showing the actuators and the gate operating mechanism;

Fig. 4 is a rear elevation of part of the mechanism as viewed from the top of Fig. 3, showing mechanism for operating the gate for segregating cards;

Fig. 5 is a vertical section taken on the line 5—5 of Fig. 3;

Fig. 6 is a somewhat general plan view looking down on the top of Fig. 2, showing the means for operating the card stop latch bars;

Fig. 7 is a vertical section taken on the line 7—7 of Fig. 6;

Fig. 8 is a similar section showing the parts in their position when one latch bar is unblocked;

Fig. 10 is a somewhat general view of the front of the machine showing control button for the non-print mechanism, its relation to the gate control and non-print mechanisms;

Fig. 11 is a view somewhat similar to Fig. 3 but showing the gate control mechanism when operated only by the non-print mechanism and not by the trailer card control holes;

Fig. 12 is a side elevation as viewed from the right side of Fig. 11;

Fig. 13 is a vertical section taken on the line 13—13 of Fig. 12;

Fig. 16 is a timing diagram for those mechanisms related especially to the line finding mechanism;

Fig. 17 is a partial plan view of the control levers for field selection and line finding control shown in Fig. 2 in elevation in position when line finding is ineffective;

Fig. 18 is a similar view showing these levers in their relative position when automatic line finding is effective;

Fig. 19 is a detail section taken on the line 19—19 of Fig. 18; and

Fig. 20 is a somewhat general and enlarged elevation partly in section taken on the line 20—20 of Fig. 7, showing the means for reciprocating the latch bars and operating the stop retract arms.

Referring now merely to the specific form of the apparatus which represents the present preferred form which the invention may assume, the automatic line finding mechanism herein is dependent upon the presence of control holes which have been perviously punched in the trailer cards in a multi-control-reproducer which employs a special wiring unit as set forth in my co-pending application Serial Number 289,300, filed May 22, 1952, and entitled "Wiring Unit for Record Reproducing Machine."

Figure 1:
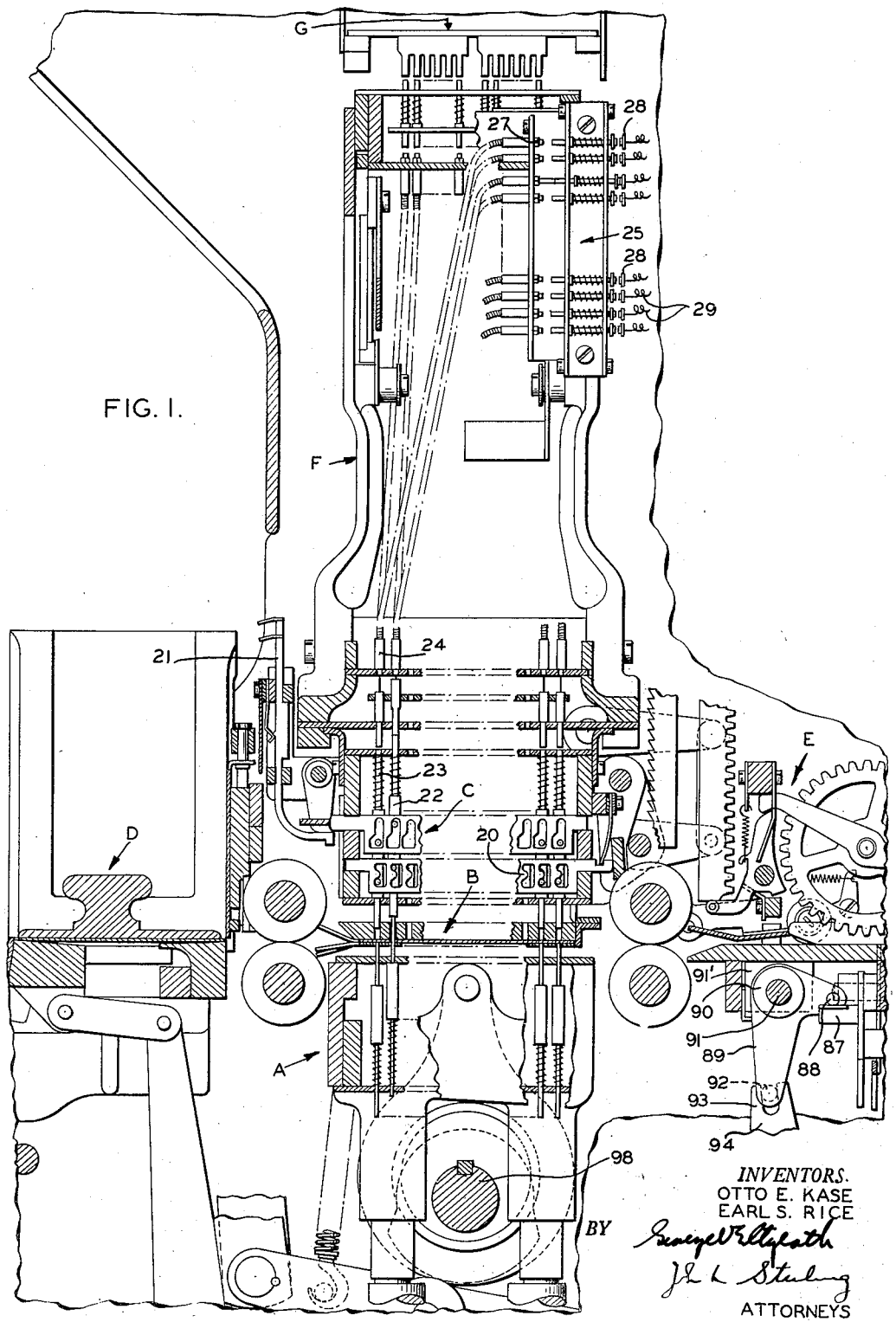

In the general view of the machine shown in Fig. 1, it will be noted that there is the usual reciprocating sensing pin box A, the card chamber B, the set pin unit C, and car magazine D, the printing mechanism E, the wiring unit F, and the permutation bar unit G. The wiring unit, except as hereinafter set forth, is of the type shown in Ritzert U. S. Patent 2,311,471 (Fig. 14 thereof) above mentioned and by means of a manually settable lever may be set for upper or lower zone interpretation. For the purposes of the machine described herein it will be set for upper zone interpretation. This setting will therefor make the lower zone sensing pins ineffective with respect to the permutation bars in unit G so that although the data in the lower zone of cards may be sensed such information is not printed.

Since the control holes employed to effect automatic line finding may be any lower zone card columns, the lock slide disabling controls for these columns must be actuated to disable these slides so that the pins encountering these holes may rise and fall but are not locked up. In the companion application, above noted, columns 88 and 89 were chosen as control holes columns. Since there may be thirteen lines of printing in the upper zone of the card there may be a maximum of twelve holes possible in any one card. The set pin unit C has therein a series of lower lock slides 20, which are disabled in the usual manner by means of disabling control elements 21 to hold them retracted so that the set pins 22 may be moved up but not locked up. Assuming a stack of cards are disposed in the magazine D including a series of lead cards each followed by matching trailer cards and that the data on the lead cards in the upper zones thereof is to be printed on the upper zones of the trailer cards but not to be printed on the lead cards. In that case the usual nonprint mechanism is operated so that no printing is done on the lead cards. The lead card is then sensed and the date set up in the usual manner. The lead card then passes through the machine and is ejected into the front pocket by mechanism hereinafter described. The trailer cards is advanced into the machine and is sensed, but since there are data and control holes only in its lower zone nothing will be set up from the data. If there is no control hole in the trailer card it will advance to the printing position and printing will take place on the first line of the upper zone since all the card stops will be up. If there is one control hole in the card, it will, as explained in the above application, be the first control hole and it will cause the pinp assing through it to actuate a set pin above that position, such as set pin 23, which will operate a Bowden wire 24 extending up in the wiring unit F to a support 25 on which are mounted a series of spring retracted pins 26 which are alined with the ends of the Bowden wires just mentioned which are mounted at 27 on said frame. The movement of the wire 24 will move its alined pin 26 to close an associated switch element 28. It is to be noted that for each control hole which may be on the card passing through the chamber B there will be a Bowden wire 24 extending to an alined pin 26 on the frame 25 as well as an associated switch element 28. Each switch 28 is connected by a wire 29 to an electro-magnetic actuator 30 (Fig. 5) so that for each switch there is an actuator. Each actuator 30 has an armature 31 to actuate a linkage 32 connected to a bell crank 33. Each bell crank 33 is adapted to engage an associated Bowden wire element 34, each extending to and associated with its spring retracted pin 35.

These pins 35 are adapted to engage and operate respectively a series of multi-armed bell cranks 36 rotatably mounted on a common shaft 37. The pins 35 when actuated move forward to engage an arm 38 (Fig. 8), to rotate said bell-cranks and cause another arm 39 thereon to be moved down. This arm 39 normally (see Fig. 7) lies in blocking position in the path of the end of a latch bar 40. The bell crank 36 has another arm 41 engaged by a spring 42 and tending to hold the bell crank in blocking condition with respect to the latch bar 40. Still another arm 43 on the bell crank 36 is adapted to be engaged by a manually operated release bar 44 which is mounted on a rotatable bar 45 and is adapted to be operated in any suitable manner, and, when operated, engages all the arms 43 of all the bell cranks 36 to lower the blocking arms 39 so that the latch bars 40 may operate in the normal manner when automatic line finding is not to be effective.

Referring particularly to Figs. 2, 6, 7, 8, and 18–21 inclusive, it will be noted that for this embodiment there will be thirteen pairs of card stops 46. The first twelve pairs of stops controlling the printing on the first twelve lines in the upper zone of the card are under the control of the automatic line finding mechanism in a manner now to be described.

Figure 2:
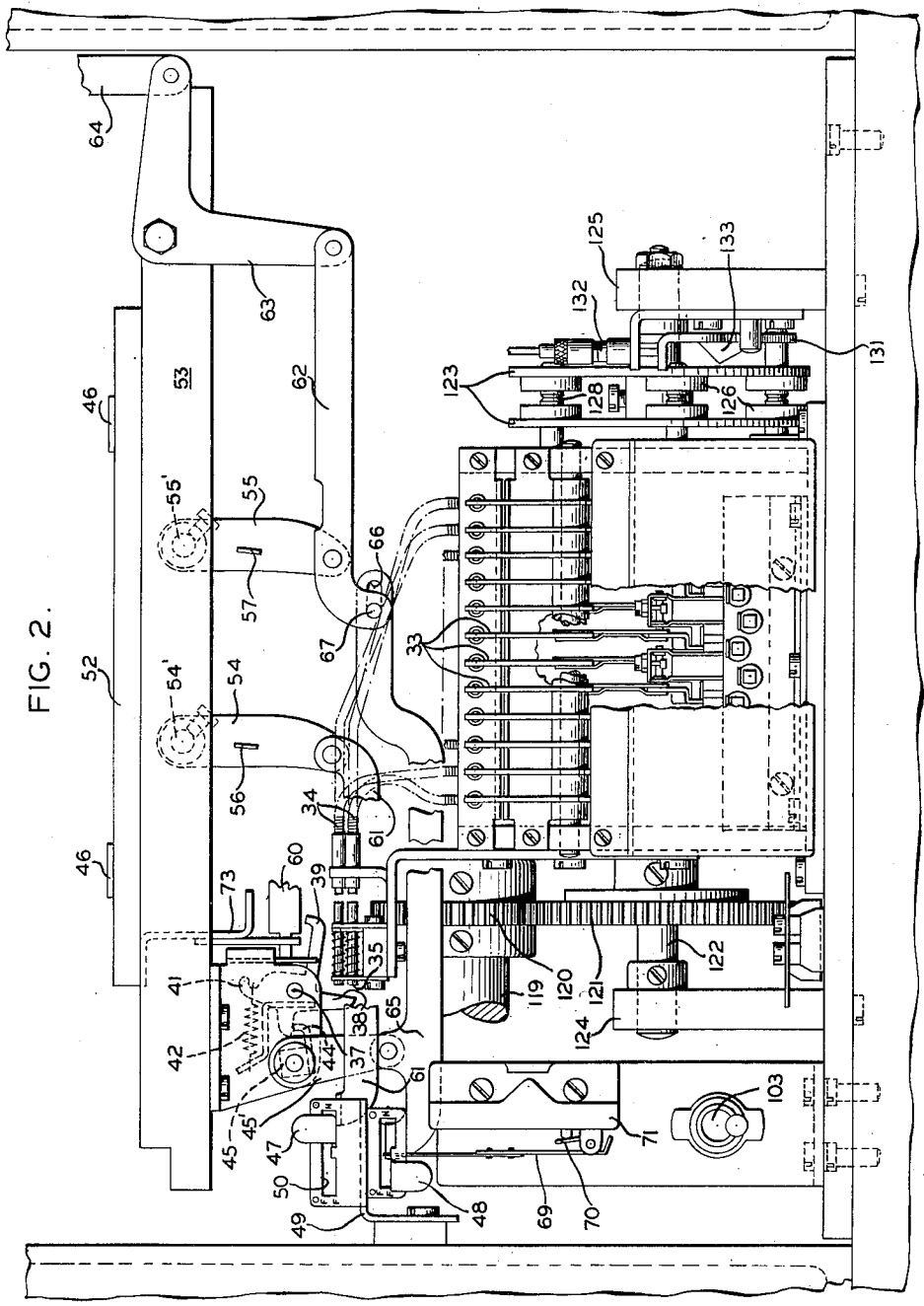
Fig. 2 is a partial rear elevation of the machine, showing the means for blocking and unblocking the card stops.

In Figs. 2, 17 and 18 there are seen two levers 47 and 48. 47 is the field selector lever which has to do with the upper or lower field of printing to be selected and 48 is the automatic line finding control lever and has two positions "on" and "off." These levers are pivotally mounted on a bracket 49 fixed to the frame of the machine and their outer ends operate in notched slots such as 50 and 51.

The printing platform 52 (Fig. 2) is mounted on a frame element 53 in which is journaled two shafts 54' and 55' from which depend two oscillatable pairs of carrier arms 54 and 55 supporting slide bars 56 and 57 adapted to extend across and cooperate with notches 58 and 59 in the upper edges of all twelve of the card stop latch bars 40. The rearmost carrier arm 54 is connected at its lower end to a link 61 which at its other end is connected to the inner end of the control lever 47 previously mentioned and as seen clearly in Fig. 17 and 18. The carrier arm 55 is connected to a link 62 in turn connected to a bell crank 63 pivoted on the frame element 53 and with its other end connected to a link 64 which is connected to the manual setting lever on the wiring unit of the interpreter (see Fig. 14 of Ritzert Patent No. 2,311,471, lever 208). By this lever the unit is set for upper or lower zone interpretation. The manual setting of these two arms forms no direct part of the invention as such except that when automatic line finding operation is to be effective the lever 47 is moved to the right (Fig. 21) in its slot which moves the link 61 and arm 54 to the left of its disabled position.

With respect to the control lever 48 when it is moved to the left (Fig. 17) the automatic line finding operation is disabled and when it is moved to the right this function is effective. The lever 48 at its inner end is connected to a link 65 which at its other end has a slot 66 therein. In this slot rides a pin 67 mounted on the dependent end of the link 62. When the link 65 is moved to the left the end of slot 66 encounters pin 67 and moves the arm 55 to the left to a disabled position. When the lever 48 is thus moved to the right its right edge encounters the upper end of a flexible arm 69, the other end 70 of which is pressed against the button of a micro switch 71 to close the circuit of the automatic line finder circuit as will be seen in connection with the description of the circuit operation hereinafter. With both control levers 47 and 48 disposed to the right the inner ends thereof are moved to the left and the left side of the rear end of lever 48 abuts a dependent pin 72 on the lever 47 (Figs. 18, 19 and 20) and prevents the lever 47 from being moved to the left as long as the lever 48 is disposed in its right hand position. This prevents the arms from being enabled for manual setting while the automatic line finding mechanism is in effective operation.

As seen most clearly in Figs. 7 and 8, the series of twelve latch bars 40 are slidably mounted from brackets 73 and 74 dependent from the frame member 53 and each is urged to the left by a spring 76 surrounding a reduced end 75 thereof. Each latch bar 40 has a pair of extrusions 77 thereon adapted to engage notches 78 in the lower stems 79 of the card stops 46. Springs 80 are disposed between the brackets 73 and 74 and the bottom of the stops to urge these stops upwardly when released. In these figures the slide bars 56 and 57 are shown in their disabled positions with respect to the latch bars 40 so that these latch bars may be reciprocated without interference by the slide bars.

However, for automatic line finding these latch bars are cyclically oscillated by means of a slide bar 81 mounted between a central carrier arm 82 and a bell crank 86 fixed to a shaft 83 mounted on frame member 53 similar to the mounting of the shafts 54' and 55' above mentioned. A spring 84 connects at one end to the bar 81 and at the other end is anchored on the support for these shafts and moves said bar 81 in one direction. The bar 81 cooperates with a notch 85 in the top of each of the twelve latch bars 40. This arm 82 is oscillated in a manner to be described and will move the latch bars to the right against the resistance of their springs 76 and when it moves in the other direction the springs will force the latch bars to the left and tend to engage the extrusions 77 in the notches 78. The shaft 83 is oscillated by reason of the fact that bell crank 86 at its rear end has a transversely extending arm, the outer end 87 (Fig. 20) of which is adapted to be engaged by a pin 88 on a bell crank 89 fixed to a sleeve 90 rotatably mounted on a shaft 91 mounted in spaced bracket plates 91'. The lower end of the bell crank 89 has a pin 92 riding in a fork 93 in the upper end of an arm 94 pivoted on fixed shaft 96 and having a roller 95 thereon which cooperates with a cam 97 secured on shaft 98 to effect the oscillation of the center shaft 83 and thereby the reciprocation of the latch bars. The shaft 91 is also oscillated by a cam 97' on shaft 98 engaging a roller 95' on an arm 94' pivoted on shaft 96 and having a fork 93' engaging a pin 92' on an arm 89' dependent from a sleeve 90' fixed to shaft 90 to raise and lower stop retract arms 99 and 100 which are fixed thereto and when lowered, these arms press down on the card stops through the intermediary of lateral lips 101 to aline the notches on the stops with the extrusions on the latch bars as before set forth. These retract arms are operated cyclically in accordance with the regular timed operation of the machine.

Referring now particularly to Figs. 7 and 8, the first figure shows the latch bars 40 in their extreme right hand position under the influence of the slide bar 81 with the slide bars 56 and 57 disabled and not affecting the movement of the latch bars. If the latch bars were allowed to reciprocate back and forth freely and in view of the timed depression of the stops by the retract bars 99 and 100 the latch bars would cooperatively engage their extrusions with the notches in the stop stems 79 at the extreme left hand movement of the bars 40. However, it is desired in this instance to allow the stops to be lowered and raised cyclically and not to be held down except for a particular circumstance. In order to hold the stops down only when desired, a mechanism is provided which has been described and includes the multi-armed bell cranks 36 operated under the control of the actuators 30 which are in turn under the influence of the control holes in the card being sensed. These bell cranks are mounted on the shaft 37 in a supporting bracket 102 attached to the frame of the machine.

When a card enters the interpreter which has twelve control holes in it, it is printed on the thirteenth line of the upper zone of the card and then it is desired to segregate this "fully posted" card from the cards which have not been fully posted. In order to achieve this object the following mechanism is provided:

In Fig. 2 is shown a switch 103 which is also indicated in the circuit of Fig. 16. This switch controls the opening and closing of a circuit to a thirteenth actuator numbered 104 (Fig. 4). In the circuit this thirteenth actuator is shown as connected in parallel with the twelfth actuator 30 so that when the twelfth control hole in the card is sensed to print the data on the thirteenth line thereof the thirteenth actuator is also energized to set the pocket gate to drop the card in the front pocket when it is discharged from the machine. The armature 105 of this actuator 104 (Fig. 4) is connected to a linkage 106 which is connected to one end 107 of a pivoted lever held in normal position by a spring 108. The opposite end of this lever is formed as a cam shaped interponent 109. It is seen that when the actuator 104 is energized it will cause the cam-shaped interponent 109 to be advanced from its normal position shown in Fig. 4.

With especial reference to Figs. 4, and 9 to 14 inclusive, there is shown the mechanism whereby the master cards may be segregated into a special pocket upon the setting of the "non-print or retract" mechanism of the machine and whereby the trailer cards being interpreted may also be segregated therewith when they are fully posted. Some of the mechanism shown is part of the regular interpreter and will not be described in detail except insofar as to indicate how it cooperates with the novel mechanism related to the line finding mechanism forming this invention.

Figure 9:
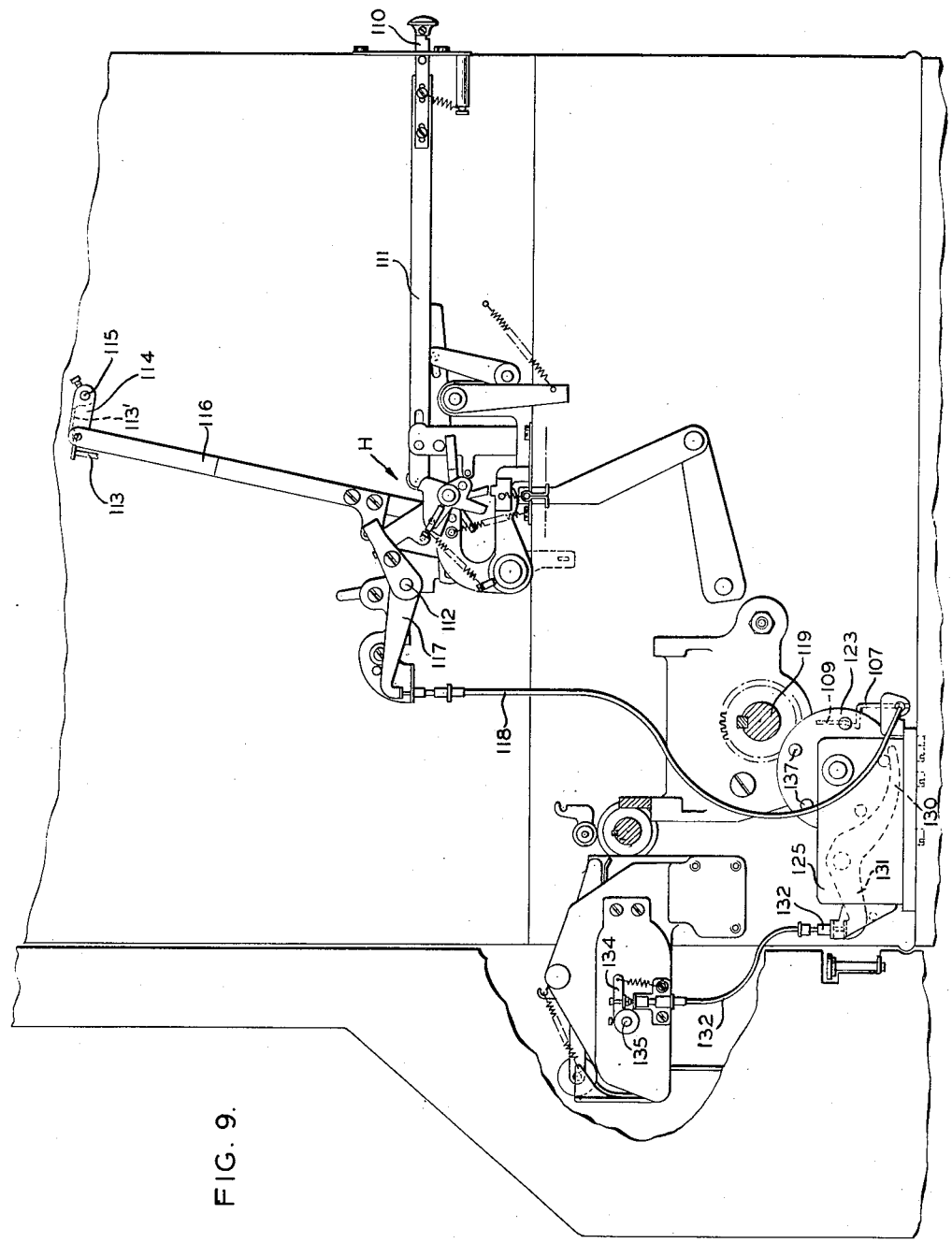
Fig. 9 is a somewhat general side view of the machine showing the non-print mechanism and its relation to the gate control mechanism.

In Fig. 9 is shown a general view of a non-print mechanism in use on the interpreter, which forms no direct part of the invention but which, in its operation, cooperates in the segregation of "fully posted" cards. The mechanism is generally indicated by the letter H. A button 110 is operated to set a link 111 to dispose the mechanism for segregation and non-print operations in the usual manner as indicated in Mueller above mentioned. The nonprint function is brought into play by the sensing of a control hole in the card by a pin 113 which lifts a connection in the wiring unit to raise arm 113' on shaft 115 (see Fig. 7 of above patent pin 85, arm 87, shaft 86). Shaft 115 is connected to arm 114 in turn connected to link 116 which is lifted and (in a manner not shown) causes the rocking of shaft 112. On this shaft is an arm 117 which is thereby moved counterclockwise to move a Bowden wire 118 downwardly. This wire at its other end is adapted to engage the lower end of the pivoted lever 107 previously mentioned. It will therefore be evident that this lever 107 is operated either through the intermediary of the "non-print" mechanism just generally described or by the sensing of a twelfth hole in the card in order to segregate said card after it is thus fully posted.

The mechanism which is activated by the described movement of the pivoted lever 107 involves mechanism shown most in detail in Figs. 11, 12 and 13. A main shaft 119 carries a gear 120 meshing with a gear 121 on a shaft 122 to which is secured a pair of spaced plates 123. The shaft 122 is supported between uprights 124 and 125. Disposed on adjacent faces of the plates 123 and equally spaced angular distances adjacent the periphery thereof are bosses 126 in which are positioned for longitudinal movement buttons 127. The stems of these buttons are each provided with a pair of annular notches 128. These buttons are adapted to be moved axially as will be later set forth and therefore one or the other of these notches is presented between the bosses 126 as shown in Fig. 11 and are engaged by a coiled spring 129 to hold the buttons 127 in one or the other of their two positions. In the figure the buttons are shown in both positions.

In the operation of the machine the sensing of a "non-print" control hole to actuate the Bowden wire 118, and the sensing of the twelfth hole in a card which is to be fully posted, are so timed in the sequence of operations of the various elements of the machine, and which it is not necessary to describe in detail, that when these sensing actions take place the button 127 disposed opposite the pivoted lever 107 is moved forward to effective position in which it will encounter the edge 130 of a lever 131 pivoted to the support 125. This edge is eccentric to the circular path of the buttons so that as the button is thus advanced and encounters this edge it will depress this end of the lever 131 and elevate the opposite end which is associated with a Bowden wire 132. After the projected end of the button has left the edge of the lever 131, it will encounter a cam plate 133 on the support 125 which will cam it back to normal position wherein the spring 129 will engage the other notch in its stem to hold it back in retracted position until it is again pushed forward. In the timing of these operations which, in itself, forms no part of this invention, a button is presented in front of the lever 107 at the time when a control hole of one or the other kind is sensed to effect the operation of the gate about 90° later.

Figure 14:
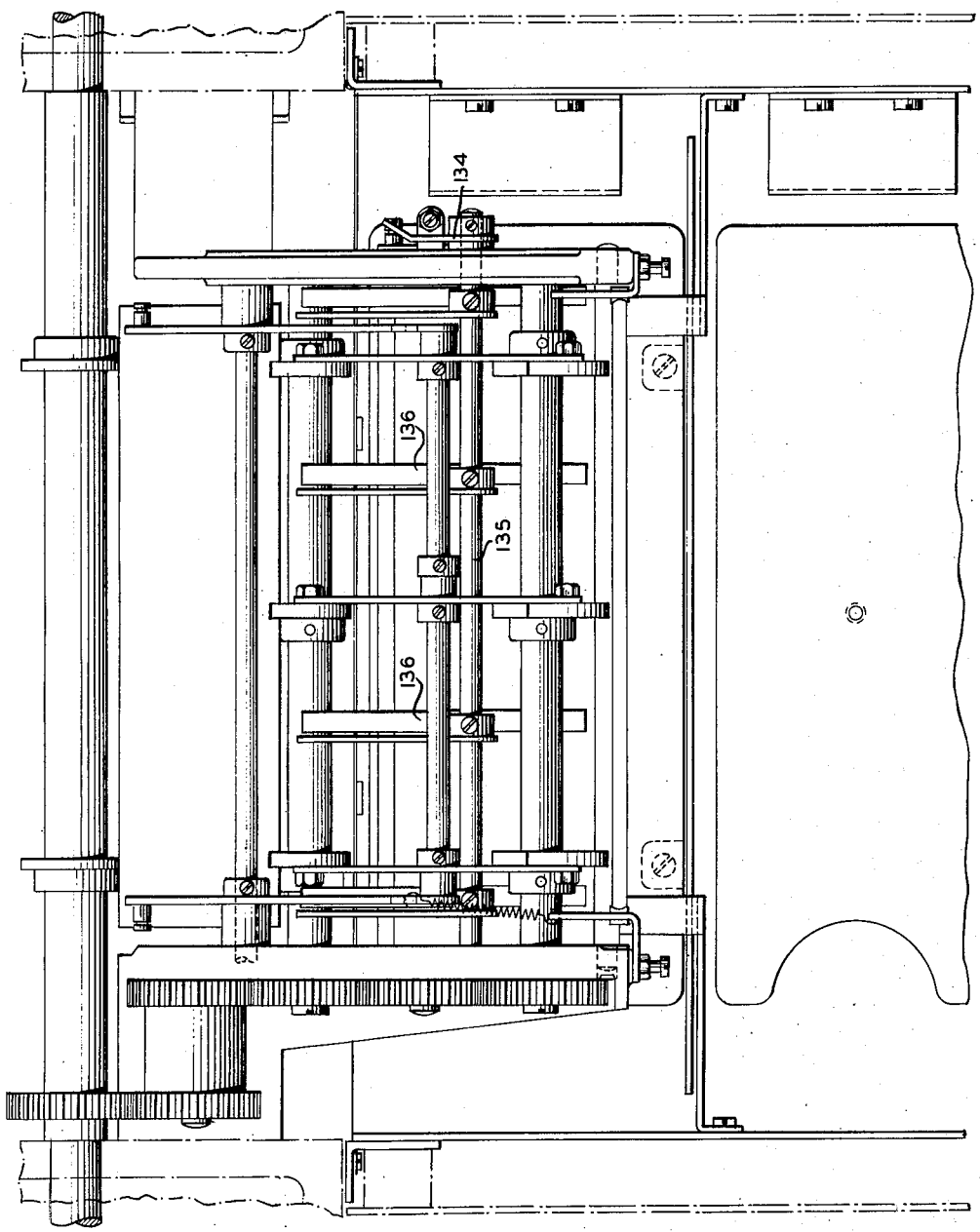
Fig. 14 is a partial general plan view of the card receiver and gate mechanism.

Reference to Figs. 9 and 14, it will be seen that when the Bowden wire 132 is operated it elevates an arm 134 connected to front gate shaft 135. In Fig. 14 a general plan view of the gate mechanism is shown and the shaft 135 has secured thereon gates 136 so that when the shaft is turned the gates will be elevated to guide the card into the front pocket. Various mechanisms are already well known in the art for actuating these gates to direct cards into the front pocket and no further description of this structure is deemed necessary since the only novel feature herein involved is the means whereby the gate mechanism is operated either by the sensing of a master card or the sensing of a "fully posted" trailer or detail card.

Figure 15:
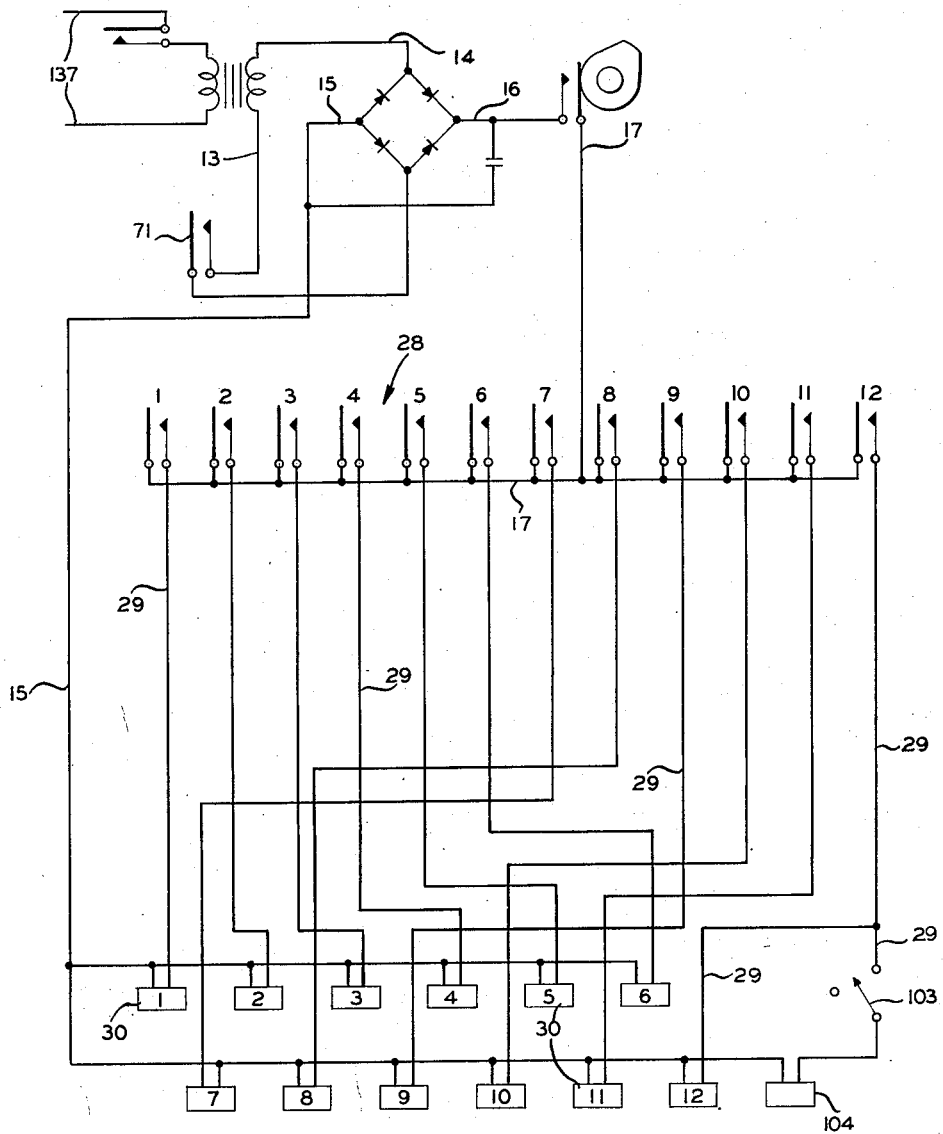
Fig. 15 is a schematic diagram of the electrical circuits involved in this machine, with special reference to the automatic line finding operations.

The electrical circuit for the automatic line finder mechanism is shown in Fig. 15. Wires 137 from a source of power lead to a transformer primary and in this circuit is a clutch-operated switch which is only closed when a working cycle of the machine is initiated. The secondary of the transformer is connected to a rectifier by wires 13 and 14. Wires 15 and 16 extend from the D. C. side of the rectifier, 16 being the positive wire and 15 the negative wire. Wire 15 extends to and acts as the common return wire from the coils of a series of twelve actuators 30 and a special actuator 104 which is in parallel with the No. 12 actuator 30 as shown.

Wire 16 leads from the rectifier to one side of a switch controlled by a timing cam, wire 17 extending from the other side of the switch and acting as a common lead-in wire to one side of a series of twelve switches 28. Wires 29 connected to the other sides of these switches with one side of the coils of the actuators 30 and 104. In the parallel path of the wire 29 leading to the actuator 104 is a switch 103 which is operated manually so as to make this particular segregating actuator "effective" or "ineffective".

In summarizing the circuit operation, it is assumed that the power has been applied. At this time the motor is running but the transformer is not connected until the operator initiates an interpreting operation which throws in the usual clutch on the machine. When this happens the clutch-operated switch is closed and thus the power is applied to the transformer. When the manually operated control switch 71 is moved to the "on" position this throws the rectifier in circuit through wires 13 and 14. If the segregation of "fully posted" cards is to take place the "on-off" switch 103 connected to the 13th actuator is closed, otherwise not. With the start of the mechanical motion of interpretation the timing cam will rotate and in timed sequence will close its switch which will place the positive side of the rectifier over wire 17, in circuit with one side of each of the switches 28 which are closed when control holes in the card are sensed.

It will be assumed that the tracing of one circuit operation will be sufficient to understand the operation of all the others since they are identical to all extents and purposes. Let us assume that there is one control hole in the card namely hole No. 1. The punching of this hole is for the purpose of holding down the No. 1 card stop so that printing or interpretation may take place on the second line in the upper zone of the card. Let us also assume that the machine is to segregate "fully posted" cards and therefore that the "on-off" switch connected to the 13th actuator is closed. The circuit will proceed from the line through the clutch operated switch to the transformer, then through the rectifier. It then proceeds over wire 16 to the switch operated by the timing cam, then over wire 17 to the switch 28 related to the No. 1 hole which switch is closed when the No. 1 hole is sensed. Then it proceeds over the other side of this switch over wire 29 to the No. 1 actuator and back over wire 15 to the negative side of the rectifier. This operation will cause the mechanical action above described to depress the No. 1 stop and permit printing on the second line of the card. If the card has controls Nos. 1, 2, and 3 therein then, similarly, the Nos. 1, 2, and 3 actuators will be energized to hold down the Nos. 1, 2, and 3 card stops and permit printing on the fourth line of the card. If the card has twelve control holes in it, which are punched "seriatim" therein, then it is fully posted. In this case all twelve of the actuators will be energized and will cause the hold down of twelve card stops to permit printing on the thirteenth line. Since the No. 12 actuator has been placed in circuit, and since the thirteenth actuator 104 is in a parallel circuit with it, this also will be energized when the related "on-off" switch is closed. Previously described mechanism related to this thirteenth actuator will open the front gate of the pair of receiver pockets and allow the "fully posted" card to be segregated from those not fully posted, which latter will drop into the rear pocket. By throwing the lever control switch 48 to the "off" position the whole line finder circuit is disconnected from the power and therefore the machine may operate in ordinary fashion to interpret under manual control of the card stops as hitherto practised.

*General summary of operation*

When a master card enters the sensing chamber to have its data set up, if it is to be segregated without printing thereon, it will have a "non-print" control hole in it, as is usual, and this hole will, in the manner described, operate the "non-print" mechanism shown in Fig. 9. The operation of this mechanism will cause the actuation of the arm 117 to operate the Bowden wire 118 and trip the gate opening mechanism above described so that the card is deposited into the front pocket.

On the other hand, when the trailer or "non-master" cards enter the sensing chamber, they are not sensed but the control holes therein will actuate the Bowden wires 24 to move the set pins 25 and actuate the switches 28 and energize, over wires 29, the circuits of the actuators 30. If only one control hole is in the card, only the No. 1 actuator will be energized; if two holes are therein then Nos. 1 and 2 actuators will be energized and so on. If twelve holes are in the card it is "fully posted" as it leaves the machine after having been printed on the thirteenth line. In this case all thirteen actuators are energized. The result of this is that all the stops except the thirteenth are held down and the printing takes place on the thirteenth line of the card. At the same time, in this circumstance, the thirteenth actuator 104 will operate in the manner previously set forth (Fig. 4) to operate the gate opening mechanism and allow the "fully posted" cards to enter the pocket with any master cards which may have been deposited therein.

As any one of the first twelve actuators is energized in the above manner (Fig. 5) its armature 31 pulls on link 32 to oscillate bell crank 33 and push Bowden wire 34 to move pin 35 forward to contact arm 38 of its associated bell crank 36 and pull down the blocking arm 39. This will permit the associated latch bar 40 to be moved to the left on its next movement in that direction under the impulse of spring 76 so as to engage the extrusions 77 in the notches 78 and 79 on the stems of the associated pair of stops 46 which have, in a timed manner, at this time in the cycle, been depressed by the retract arms 99 and 100. Thus these stops will be held down and the card advanced to printing position abutting the next stop and print on that line.

It is therefore evident that the stops held down will be determined by the number of control holes in the card. In other words, if you wish to print on the first line, no control holes are required and all the stops will be up and the card will abut the first stop. If you wish to print on the second line, then one control hole is needed and the first stop is held down and the card advances to abut the second stop and so on. The card, in other words, is punched seriatim with the required number of control holes which determine the line upon which the printing is to take place in the interpreter. The manner of thus punching the cards is set forth in the above mentioned copending application.

The machine of the type shown can be and is used for manual determination of the line on which to print, as well as for automatic line finding operation. To transfer to the automatic operation it is merely necessary, for the reasons above set forth, to move the control lever 47 to the right and the switch control lever 48 also to the right thereby to disable the carrier arms 54 and 55 with their associated slide bars 56 and 57. This will permit the oscillating slide bar 81 to take over control of all the latch bars 40, and thus permit their engagement with the associated stops in accordance with which blocking members are actuated to unblock the bars which results in the holding down of the appropriate stops. To restore the machine for manual operation it is merely necessary to move the control lever 48 to the left and this will move the link 65 to the right and restore the carrier arm 55 to normal position under control of the link 64. The carrier arm 54 will also then be completely under the control of lever 47 to determine whether printing is to take place in the upper or lower zone of the card in the usual manner. When the link 65 is moved to the right the arm 45' connected to it and to the rotatable shaft 45 is moved to the right and rotates the shaft counter-clockwise to lift the release bar 44 to engage the arms 43 of the bell cranks 36 whereby all the blocking fingers or arms 39 are depressed and the latch bars 40 free to be controlled in the usual manner for manual determination of the printing line.

Fig. 16 sets forth a timing diagram especially for several mechanisms which relate more directly to the automatic line finding apparatus. The upper horizontal row of this figure represents the timed movement of the cam which actuates the sensing pins and, through the Bowden wires 29, closes the switches 27 in accordance with the control holes in the card. It will be seen here that the wires reach the switches at 310 degrees in the cycle and close them at 320 degrees. They remain closed until 48 degrees of the next cycle and remain open until 320 degrees of the same cycle. The next or second horizontal column shows the action of the timing cam shown in Fig. 15 which applies the power of the rectifier to the line finding circuit. It will be noted that this circuit is closed from 2 degrees to 48 degrees when the contacts open. Therefore the power is available when the switches 27 are closed so that the actuators 30 and 104 may be actuated if there are control holes in the card. These contacts are open from 48 degrees until 348 degrees when they close again and remain closed until 2 degrees of the next cycle. Therefore this circuit can not be closed until after the Bowden wires have closed the switches 27. The third horizontal row indicates the control of the latch bars 40 by cam 97. It will be seen that the latch bars 40 are released by the bar 81 at 10 degrees and start to the left (Fig. 7) at 15 degrees and are fully to the left at 32 degrees. This word "fully" means of course that they have gone as far to the left as they can depending upon whether the blocking arms 39 are in effective or ineffective position. They remain "in" until 270 degrees when they start to the right and at 292 degrees they are fully to the right against the resistance of springs 76. It will be seen that the latch bars 40 are fully to the left while the main circuit is still closed and while the switches 27 are closed so that if any of these bars 40 are unblocked they may move fully to the left and latch with the stops and hold them down. It will also be observed that the latch bars 40 start moving to the right at 270 degrees and are fully to the right at 292 degrees before either the main circuit or the switches 27 are closed. The fourth horizontal row indicates the movement of the card stops 46 (under control of arms 99, 100 and cam 97'). It will be seen that they do not start up until 156 degrees and are fully up at 170 degrees. Of course those stops whose latch bars 40 have been unblocked are held down and do not start up at this time. The stops start down at 248 degrees and are fully down at 292 degrees. They clear the table at 252 degrees so as to be out of the way of a card advancing to be sensed as to its control holes. It will also be seen that the stops are down before the switches 27 are closed, before the main circuit is closed, and while the latch bars are fully to the left so that, since they remain down until 156 degrees of the next cycle, they are down when the mechanism determines whether or not certail latch bars are to be unblocked and the corresponding stops held down.

While the invention herein has been fully shown and described in detail with respect to a present preferred form which the invention may assume, it is not to be limited to the specific form shown since many changes and modifications may be made in the structure and parts without departing from the spirit and scope of the invention in its broadest aspects. Hence it is desired to cover any and all forms and modifications of the invention which may come within the spirit and scope of any one or more of the appended claims.

What we claim as new, and desire to secure by Letters Patent, is:

1. In an interpreting machine, means for sensing a card having a control hole therein, a card stop, a latch means for said stop, cooperative means on the stop and latch to hold the stop in a lowered position when the latch is moved to engaging position, cyclically operated means for raising and lowering the stop, cyclically operated means to move the latch means to and from the engaging position, a blocking means normally preventing full movement of the latch means to engaging position, and means associated with the blocking means, and made effective by the sensing of the control hole to release the blocking means and permit the latch means to become effective to hold the stop in lowered position.

2. In an interpreting machine, means for sensing a card having a control hole therein, a card stop, a latch means for said stop, cooperative means on the stop and the latch to hold the stop in a lowered position when the latch is moved to engaging position, cyclically operated means for raising and lowering the stop, cyclically operated means to move the latch means to and from the engaging position, a blocking means normally preventing full movement of the latch to engaging position, an electromagnetic actuator connected to said blocking means to move it to unblocking position when actuated, and means made effective by the control hole to energize said actuator to achieve the release of the blocking means and permit the latch means to become effective to hold the stop in lowered position.

3. In an interpreting machine, means for sensing a card having a control hole therein, a card stop, a latch means for said stop, cooperative means on the latch and the stop to hold the stop in a lowered position when the latch is moved to engaging position, cyclically operated means for raising and lowering the stop, cyclically operated means to move the latch means to and from the engaging position, a blocking means normally preventing full movement of the latch to engaging position, an electromagnetic actuator connected to said blocking means to move it to unblocking position when actuated, a switch in circuit with said actuator, and a connector associated with said switch and moved by the sensing of the control hole in the card to close said switch and cause the energization of the actuator.

4. In an interpreting machine, means for sensing a card having a control hole therein, a card stop, a reciprocable latch bar for said stop, cooperative means on the latch bar and the stop to hold the stop in a lowered position when the latch bar is moved to engaging position, cyclically operated means for raising and lowering the stop, cyclically operated means to reciprocate the latch bar to and from the engaging position, means associated with the latch bar normally to block its full movement to engaging position, and means associated with the blocking means, and made effective by the sensing of the control hole to release the blocking means and permit the latching means to become effective to hold the stop in lowered position.

5. In an interpreting machine, means for sensing a card having a control hole therein, a card stop, a reciprocating latch bar for said stop, cooperative means on the latch bar and the stop to hold the stop in a lowered position when the latch bar is moved to engaging position, cyclically operated means for raising and lowering the stop, cyclically operated means to reciprocate the latch bar to and from engaging position, means associated with the latch bar normally to block its full movement to engaging position, an electromagnetic actuator connected to said blocking means to move it to unblocking position when actuated, and means made effective by the sensing of the control hole to energize said actuator to achieve the release of the blocking means and permit the latch bar to become effective to hold the stop in lowered position.

6. In an interpreting machine, means for sensing a card having a control hole therein, a card stop, a reciprocating latch bar for said stop, cooperative means on the latch bar and the stop to hold the stop in lowered position when the latch bar is moved to engaging position, cyclically operated means for raising and lowering the stop, cyclically operated means to reciprocate the latch bar to and from engaging position, means associated with the latch bar normally to block its full movement to engaging position, an electromagnetic actuator connected to said blocking means to move it to unblocking position when actuated, a switch in circuit with said actuator, and a connector associated with said switch and moved by the sensing of the control hole in the card to close said switch and cause the energization of the actuator.

7. In an interpreting machine, a plurality of card stops, means to cyclically raise and lower said stops, a plurality of latch bars respectively associated with said stops, means to cyclically reciprocate the latch bars to and from engaging position, cooperative means on the stops and the latch bars to hold the stops in lowered position when the latch bars are moved to engaging position, a plurality of means respectively associated with the latch bars normally to block their full movement to engaging position, and a plurality of means respectively associated with the blocking means to release one or more of said blocking means to permit the full movement to engaging position of said released latch bars.

8. In an interpreting machine, a plurality of card stops, means cyclically raise and lower said stops, a plurality of latch bars respectively associated with said stops, a single oscillatory means to cyclically reciprocate said latch bars to and from engaging position, cooperative means on the stops and the latch bars to hold the stops in lowered position when the latch bars are moved to engaging position, a plurality of means respectively associated with the latch bars normally to block their full movement to engaging position, and a plurality of electromagnetic means respectively associated with the blocking means to release one or more of said blocking means to permit the full movement to engaging position of the thus unblocked latch bars.

9. In an interpreting machine, a plurality of card stops, a plurality of latch bars respectively associated with said stops, a single oscillatory means to cyclically reciprocate all of said latch bars, a plurality of means respectively associated with said latch bars normally to block their full movement in one direction of their reciprocatory movement, a plurality of electromagnetic means respectively associated with the blocking means to release one or more of said blocking means to permit the full movement in a given direction of said released or unblocked latch bars, and means responsive to the presence of one or more control holes in a card being interpreted in the machine to activate one or more of said electromagnetic means to effect the unblocking of one or more of said latch bars.

10. In an interpreting machine, a plurality of card stops, a plurality of latch bars respectively associated with said stops, an oscillatory means to cyclically reciprocate all of said latch bars, a plurality of means respectively associated with the latch bars normally to block their full movement in one direction of their reciprocatory movement, a plurality of means selectively to release one or more of said blocking means to permit the full movement in a given direction of said released or unblocked latch bars, and cooperative means on the card stops and the latch bars to latch the stops in lowered position, and cyclically operated means to position the stops in lowered position to be latched when the latch bars are unblocked.

11. In an interpreting machine, a plurality of card stops, a plurality of latch bars respectively associated with said stops, a single oscillatory means to cyclically reciprocate all of said latch bars, a plurality of means respectively associated with said latch bars normally to block their full movement in one direction of their reciprocatory movement, a plurality of electromagnetic means respectively associated with the blocking means to release one or more of said blocking means to permit the full movement in a given direction of said released or unblocked latch bars, and cooperative means on the card stops and the latch bars to latch the stops in lowered position, and cyclically operated means to position the stops in lowered position to be latched when the latch bars are unblocked.

12. In an interpreting machine, a plurality of card stops, a plurality of latch bars respectively associated with said stops, a single oscillatory means to cyclically reciprocate all of said latch bars, a plurality of means respectively associated with said latch bars normally to block their full movement in one direction of their reciprocatory movement, a plurality of electromagnetic means respectively associated with the blocking means to release one or more of said blocking means to permit the full movement in a given direction of said released or unblocked latch bars, means responsive to the presence of one or more control holes in a card being interpreted in the machine to activate one or more of said electromagnetic means to effect the unblocking of one or more of said latch bars, and cooperative means on the card stops and the latch bars to latch the stops in lowered position, and cyclically operated means to position the stops in lowered position to be latched when the latch bars are unblocked.

13. In an interpreting machine, a reciprocatory latch bar having a shoulder thereon, a spring connected to said bar and tending to move it in one direction, a cyclically oscillated member adapted to engage said shoulder and move the bar in the opposite direction against the action of the spring, a card stop having a notch thereon, an extrusion on the latch bar adapted to lie in said notch, and cyclically operated means to raise and lower the card stop to aline and disaline the notch and extrusion, said spring forcing the latch bar in one direction to lie in said notch when the stop is in lowered position and the oscillatory member is moved in a direction to enable the spring to act.

14. In an interpreting machine, a reciprocatory latch bar having a shoulder thereon, a spring connected to said bar and tending to move it in one direction, a cyclically oscillated member adapted to engage said shoulder and move the bar in the opposite direction against the action of the spring, a card stop having a notch thereon, an extrusion on the latch bar adapted to lie in said notch, cyclically operated means to raise and lower the card stop to aline and disaline the notch and extrusion, said spring forcing the latch bar in one direction to lie in said notch when the stop is in lowered position and the oscillatory member is moved in a direction to enable the spring to act, and means normally associated with the latch to block its movement in a direction responsive to its spring, and means associated with said blocking means and responsive to the sensing of a control hole in a card to release said blocking means and permit the latch bar and the stop so engaged to hold down the stop.

References Cited in the file of this patent

UNITED STATES PATENTS

| | | |
|---|---|---|
| 1,449,078 | Whittlesey | Mar. 20, 1923 |
| 1,675,710 | Johnson | July 3, 1928 |
| 1,709,077 | Johnson | Apr. 16, 1929 |
| 1,962,735 | Ford | June 12, 1934 |
| 2,034,010 | Thomas | Mar. 17, 1936 |
| 2,050,745 | Woodruff | Aug. 11, 1936 |
| 2,071,487 | Zennig | Feb. 23, 1937 |
| 2,240,667 | Paris | May 6, 1941 |
| 2,311,471 | Ritzert | Feb. 16, 1943 |
| 2,456,273 | Gruver | Dec. 14, 1948 |
| 2,550,370 | Mueller | Apr. 24, 1951 |
| 2,624,273 | Wheeler | Jan. 6, 1953 |